(12) United States Patent
Dumet et al.

(10) Patent No.: US 8,320,370 B2
(45) Date of Patent: Nov. 27, 2012

(54) METHOD FOR ROUTING DATA PACKETS, AND DEVICES FOR IMPLEMENTING THE METHOD

(75) Inventors: Sylvain Dumet, Merchtem (BE); Jan Voet, Schilde (BE)

(73) Assignee: Thomson Licensing (FR)

( * ) Notice: Subject to any disclaimer, the term of this patent is extended or adjusted under 35 U.S.C. 154(b) by 499 days.

(21) Appl. No.: 10/528,598

(22) PCT Filed: Sep. 24, 2003

(86) PCT No.: PCT/EP03/50653
§ 371 (c)(1),
(2), (4) Date: Oct. 28, 2005

(87) PCT Pub. No.: WO2004/030280
PCT Pub. Date: Aug. 8, 2004

(65) Prior Publication Data
US 2006/0133363 A1   Jun. 22, 2006

(30) Foreign Application Priority Data
Sep. 25, 2002   (EP) .................................. 02447182

(51) Int. Cl.
*H04L 12/28* (2006.01)
(52) U.S. Cl. ........ 370/389; 370/229; 370/390; 370/401; 370/422; 709/224; 709/236; 709/238
(58) Field of Classification Search .................. 370/229, 370/389, 390, 392, 401, 402; 709/224, 236, 709/238
See application file for complete search history.

(56) References Cited

U.S. PATENT DOCUMENTS

| 5,390,173 | A | * | 2/1995 | Spinney et al. | 370/393 |
|---|---|---|---|---|---|
| 5,546,385 | A | * | 8/1996 | Caspi et al. | 370/412 |
| 5,583,997 | A | * | 12/1996 | Hart | 709/218 |
| 5,796,944 | A | * | 8/1998 | Hill et al. | 709/250 |
| 5,982,775 | A | * | 11/1999 | Brunner et al. | 370/401 |
| 6,137,797 | A | * | 10/2000 | Bass et al. | 370/392 |
| 6,181,681 | B1 |  | 1/2001 | Hiscock et al. |  |
| 6,457,059 | B1 | * | 9/2002 | Kobayashi | 709/242 |
| 6,484,209 | B1 | * | 11/2002 | Momirov | 709/238 |
| 6,502,135 | B1 | * | 12/2002 | Munger et al. | 709/225 |
| 6,553,028 | B1 | * | 4/2003 | Tang et al. | 370/389 |
| 6,711,163 | B1 | * | 3/2004 | Reid et al. | 370/390 |
| 6,735,201 | B1 | * | 5/2004 | Mahajan et al. | 370/390 |
| 6,778,547 | B1 | * | 8/2004 | Merchant | 370/422 |
| 6,785,274 | B2 | * | 8/2004 | Mahajan et al. | 370/390 |

(Continued)

OTHER PUBLICATIONS

Search Report Dated Jan. 29, 2004.

(Continued)

*Primary Examiner* — Ayaz Sheikh
*Assistant Examiner* — Andrew C Lee
(74) *Attorney, Agent, or Firm* — Jack Schwartz & Associates, PLLC

(57) ABSTRACT

The present invention is related to a method for routing data packets in a routing device connecting a first network and a second network, and to a corresponding routing device. The method comprises the steps of receiving a frame from a device connected to the first network; forwarding the frame to an internal bridge module of the device; checking whether the frame contains a multicast group management message and in the affirmative, creating a new frame comprising as destination address the destination address of an internal multicast group management module and as payload at least the multicast management data of the received frame; and forwarding this new frame to the internal bridge function.

10 Claims, 3 Drawing Sheets

U.S. PATENT DOCUMENTS

| | | | | |
|---|---|---|---|---|
| 6,853,639 | B1* | 2/2005 | Watanuki et al. | 370/390 |
| 6,952,421 | B1* | 10/2005 | Slater | 370/401 |
| 6,996,658 | B2* | 2/2006 | Brocco et al. | 710/312 |
| 7,016,351 | B1* | 3/2006 | Farinacci et al. | 370/392 |
| 7,016,352 | B1* | 3/2006 | Chow et al. | 370/392 |
| 7,023,849 | B2* | 4/2006 | Moriwaki et al. | 370/390 |
| 7,079,537 | B1* | 7/2006 | Kanuri et al. | 370/392 |
| 7,190,667 | B2* | 3/2007 | Susnow et al. | 370/229 |
| 7,317,722 | B2* | 1/2008 | Aquino et al. | 370/390 |
| 7,391,772 | B2* | 6/2008 | Hooper et al. | 370/390 |
| 7,554,959 | B1* | 6/2009 | Dowling | 370/338 |
| 7,835,276 | B2* | 11/2010 | Naik et al. | 370/230 |
| 7,924,837 | B1* | 4/2011 | Shabtay et al. | 370/392 |
| 2001/0055274 | A1 | 12/2001 | Hegge et al. | |
| 2002/0097728 | A1* | 7/2002 | Hinderks et al. | 370/395.52 |
| 2002/0198927 | A1* | 12/2002 | Craddock et al. | 709/200 |
| 2003/0115482 | A1* | 6/2003 | Takihiro et al. | 713/201 |
| 2003/0123453 | A1* | 7/2003 | Ooghe et al. | 370/395.53 |
| 2003/0147412 | A1* | 8/2003 | Weyman et al. | 370/419 |
| 2003/0169748 | A1* | 9/2003 | Weyman et al. | 370/401 |
| 2004/0090970 | A1* | 5/2004 | Sanchez et al. | 370/397 |
| 2004/0131064 | A1* | 7/2004 | Burwell et al. | 370/397 |

OTHER PUBLICATIONS

S. Deering, "Host extensions for IP multicasting", Request for Comments: 1112, Stanford University, Aug. 1989, pp. 1-16.

W. Fenner, "Internet Group Management Protocol, Version 2", Request for Comments 2236, Xerox PARC, Nov. 1997, pp. 1-22.

* cited by examiner

METHOD FOR ROUTING DATA PACKETS, AND DEVICES FOR IMPLEMENTING THE METHOD

This application claims the benefit, under 35 U.S.C. §365 of International Application PCT/EP03/50653, filed Sep. 24, 2003, which was published in accordance with PCT Article 21(2) on Apr. 8, 2004 in English and which claims the benefit of European patent application No. 02447182.3, filed Sep. 25, 2002.

BACKGROUND OF THE INVENTION

The invention concerns a method for routing data frames, for example Ethernet frames, in an Ethernet routing device. The invention applies to DSL modems, but is not limited to that environment.

IP multicasting is the transmission of an IP datagram to a group of devices identified by a single IP destination address. A device connected to a LAN (Local Area Network), for example an Ethernet LAN, may join or leave a group, i.e. request that multicast packets concerning a certain group be addressed to it or not. The Internet Group Management Protocol ('IGMP') provides a way for a device to report its multicast group membership to adjacent routers.

The LAN can be connected to a WAN (Wide Area Network) through a routing device. This routing device, which may be an ADSL modem, has to learn which packets received on the WAN are to be forwarded on the LAN in the context of multicast groups. For this purpose, it can monitor IGMP packets sent from the devices on the LAN to the WAN routers. This process, called 'snooping', allows the routing device to update its internal tables for the purpose of filtering packets from the WAN.

The number of IGMP packets may be fairly important. If a switch module connected to the LAN communicates IGMP packets to the multicast management control module of the routing device through control busses, the bandwidth limitations might be too important. On the other hand, the processing of frames—IGMP or not—should not be made more complex simply because of any special treatment of the IGMP frames.

SUMMARY OF THE INVENTION

The invention concerns a method for routing data packets in a routing device connecting a first network and a second network, comprising the steps of:

(a) receiving a frame from a device connected to the first network;

(b) forwarding the frame to an internal bridge module of the device;

(c) checking whether the frame contains a multicast group management message and in the affirmative, creating a new frame comprising as destination address the destination address of an internal multicast group management module and as payload at least the multicast management data of the received frame; and (d) forwarding this new frame to the internal bridge function.

By creating a new frame and sending it through the internal bridge module in the same fashion as the received frames, there is no need to use any low bit-rate control bus: the normal data bus may be used. The internal bridge module does not have to carry out any specific processing either for delivering the information to the right module. All packets, whether concerning multicast group management messages or not, are handled alike by the internal bridge function.

According to an embodiment of the invention, the first network is an Ethernet network and the steps (a) to (d) are carried out by an Ethernet switch module.

According to an embodiment of the invention, the method further comprises the step of inserting into the new frame an identifier of a port on which the initial frame was received.

According to an embodiment of the invention, the multicast group management message is an IGMP message.

Another object of the invention is a routing device for connecting a first and a second network, comprising:

(a) a switch for receiving frames from the first network;

(b) an internal bridge function for forwarding frames to appropriate modules, said bridge function being connected to the switch;

(c) a multicast group management module for maintaining up to date multicast group information based on frames received on the first network, said multicast group management module being connected to the bridge function for receiving selected frames there from;

wherein the switch is adapted to determine whether a received frame comprises a multicast group management message, and in the affirmative, providing a new frame comprising multicast group management information extracted from the original frame, wherein the second frame has a destination address equal to the address of the multicast group management module, and for delivering the new frame to the bridge function.

Another object of the invention is a switch circuit for use in a device as defined above, said circuit comprising multiple input ports, said circuit being adapted to determine whether a received frame comprises a multicast group management message, and in the affirmative, providing a new frame comprising multicast group management information extracted from the original frame, wherein the second frame has a destination address equal to the address of the multicast group management module, and for forwarding the new frame to the bridge function.

BRIEF DESCRIPTION OF THE DRAWINGS

Other characteristics and advantages of the invention will appear in the description of the non-restricting embodiment, explained with the help of the enclosed figures, among which.

More information about multicasting can be found in the documents 'IETF RFC 1112' and 'IETF RFC 2236' (Internet Engineering Task Force Request for Comments).

DETAILED DESCRIPTION OF PREFERRED EMBODIMENTS

Figure 1:
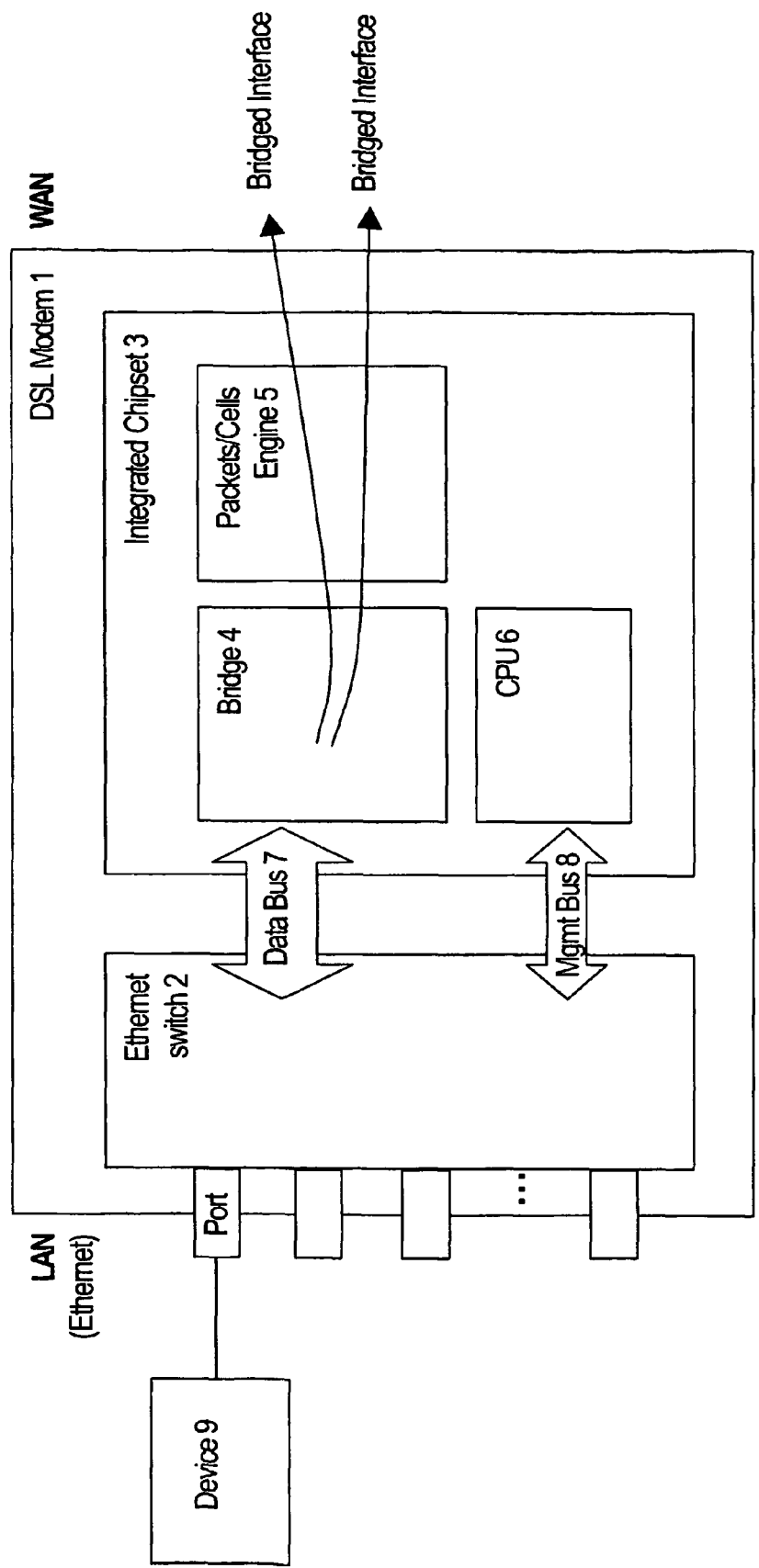
FIG. 1 is a block diagram of the device according to the present embodiment.

FIG. 1 is a schematic block diagram of a modem 1 connecting a Local Area Network (LAN) and a Wide Area Network (WAN).

The DSL modem comprises an Ethernet circuit 2 and an integrated chipset 3. The Ethernet switch 2 handles the Local Area Network (LAN) traffic received/sent through its ports. In the present embodiment, the LAN is an Ethernet network. The integrated chipset 3 contains multiple blocks: a bridge circuit 4 able to bridge incoming traffic to all bridge interfaces of the modem (namely here, ATM PVCs—for Asynchronous Transfer Mode Permanent Virtual Circuits—used in a 'bridged' mode), a 'packets and cells' engine 5 responsible for ATM and DSL encapsulation, transmission and reception and a CPU 6 that runs software for specific processing needs. The Ethernet switch 2 and the IC 3 are connected through a data bus 7 and a management and control bus 8.

The Ethernet switch receives Ethernet frames from the devices connected to its ports, e.g. device 9, which is for example a personal computer. Frames received by the switch are forwarded to the IC 3 through the data bus 7.

Figure 2:
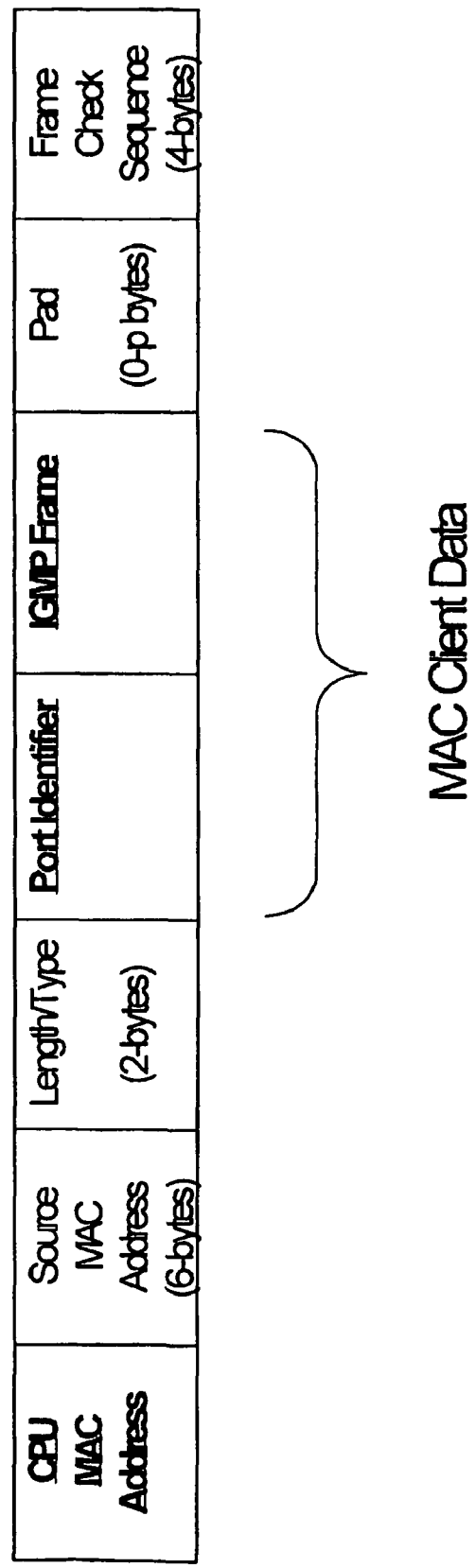
FIG. 2 is a diagram of an Ethernet frame according to the present embodiment.

According to the present embodiment, the Ethernet switch detects IGMP IP frames in the Ethernet frames transmitted by devices (not shown) on the LAN. IGMP frames are IP datagrams which IP protocol number is '2' (IGMP). When such a frame is detected, the Ethernet switch delivers the original frame to the IC 3, the Ethernet layer being removed in the CPU, when a packet is handled by the latter (and also on the destination device in the WAN). It further creates a new frame, incorporating the detected frame, as well as additional information. According to the present embodiment, this additional information is the port number of the switch on which the IGMP frame has been received. The switch transmits both the additional port information as well as the IGMP frame to the CPU 6, through the data bus. For this purpose, the switch creates a new Ethernet frame, having a destination address equal to that of the CPU 3, and containing in its payload the port information, e.g. port number, and the IGMP Ethernet frame. An example of such a frame is shown in FIG. 2. The frame is identified as being a forwarded IGMP packet with port information by a specific Type value.

The bridge circuit receives this frame, and given the destination address, transmits it to the CPU. It does not deliver this frame on the WAN. The CPU detects the presence of the port number and IGMP frame in the payload. It then uses the contents of the IGMP frame, in particular the multicast destination address, to update its multicast group information for the devices on the LAN.

If the message is a 'join group' message and the group already exists, the port number of the incoming frame is added to the group members. The information is thus transmitted to the switch, which is a managed switch having a feature that allows grouping of ports. Sending to the group is then equivalent to sending to each port being part of that group.

If the message is a 'join group' message and the group does not yet exist, it is created, and the port number of the incoming frame is added as a first group member.

If the message is a 'leave group' message, the source address is removed from the group.

The multicast information is maintained in a memory (not illustrated) by the CPU, under the form of appropriate tables.

Figure 3:
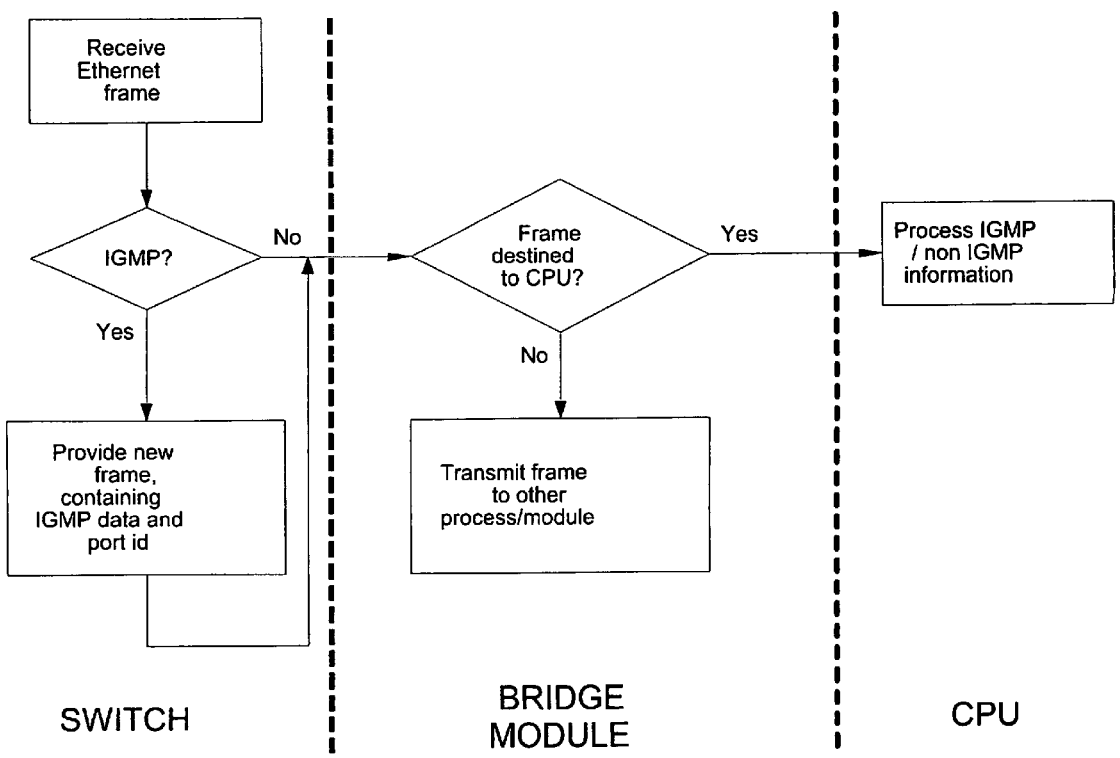
FIG. 3 is a flowchart of the method according to the present embodiment.

The above process is illustrated by the flowchart of FIG. 3.

The CPU filters IP frames having as destination address one of the multicast addresses of the groups of which devices on the LAN are members, and to transmit filtered frames on the network to the appropriate ports. The packet/cell engine 5 transmits and receives packets respectively to and from the DSL line.

Although the embodiment of the invention concerns an Ethernet and IP environment, the invention is not limited to this particular case. Moreover, other messages than IGMP messages may the processed in a similar way, and any other multicast management protocol can be used. The invention can be used in other environments when a packet of data needs to forwarded to one or more modules or processes, depending on packet content, without blocking the default path of the packet.

The invention claimed is:

1. A method for routing data packets in a routing device connecting a first network and a second network, said routing device comprising as separate components: a switch, and an integrated chipset including a bridge function, and a central processing unit (CPU) having a multicast group management module embedded therein, said method comprising the steps of:
 (a) receiving a frame, by a port of said switch, from a device connected to the first network;
 (b) forwarding the received frame to said bridge function; wherein the bridge function is performed by a means for forwarding a frame based on a destination address of the received frame;
 (c) checking, by the switch, whether the received frame contains a multicast group management message and in the affirmative, creating a new frame comprising a destination address of said multicast group management module and as payload at least multicast group management information extracted from the received frame; and
 (d) forwarding said new frame to the bridge function for transmission of the new frame to the multicast group management module to update multicast group information for the routing device.

2. The method according to claim 1, wherein the first network is an Ethernet network and wherein the steps (a) to (d) are carried out by an Ethernet switch module.

3. The method according to claim 1, further comprising the step of inserting into the new frame an identifier of a port on which the frame was received.

4. The method according to claim 1, wherein the multicast group management message is an Internet Group Management Protocol (IGMP) message.

5. The method according to claim 1, further comprising the step, by the multicast group management module upon reception of the new frame, of updating its multicast group information.

6. A routing device for connecting a first and a second network, said device comprising:
 (a) a switch for receiving frames from the first network;
 (b) a bridge function for delivering frames to appropriate modules as a function of respective frame destination addresses, said bridge function being connected to the switch;
 (c) a central processing unit (CPU) having a multicast group management module embedded therein for maintaining up to date multicast group information based on frames received on the first network, said multicast group management module being connected to the bridge function for receiving selected frames there from;
 wherein the switch determines whether a received frame comprises a multicast group management message, and in the affirmative, providing a new frame comprising multicast group management information extracted from the received frame, wherein the new frame has a destination address equal to the address of multicast group management module, and for forwarding the new frame to the bridge function for transmission of the new frame to the multicast group management module to update multicast group information for the routing device; and
 said switch, said bridge function, and said multicast group management module are separate elements in said routing device.

7. The routing device according to claim 6, wherein the switch is an Ethernet switch.

8. The routing device according to claim 6, wherein the switch comprises a plurality of ports for receiving frames, and wherein the switch further comprises means for including into the new frame a port identifier of the port on which the received frame containing the multicast group management message arrived.

9. The routing device according to claim 6, wherein the multicast group management message is an Internet Group Management Protocol (IGMP) message.

10. A switch circuit for use in a routing device, said switch circuit comprising multiple input ports and determines whether a received frame comprises a multicast group management message, wherein, upon determining the received frame comprises a multicast group management message, the switch circuit generates a new frame comprising multicast group management information extracted from the received frame and a destination address equal to the address of multicast group management module, and forwards the new frame to the bridge function for transmission to the multicast group management module to update multicast group information for the routing device.

* * * * *